US006223430B1

(12) United States Patent
Myszka et al.

(10) Patent No.: US 6,223,430 B1
(45) Date of Patent: May 1, 2001

(54) BREADMAKER CIRCUIT BOARD MOUNTING METHOD

(75) Inventors: Robert V. Myszka, Germantown; John Vancha, Kewaskum; James H. Utzerath, Dousman, all of WI (US)

(73) Assignee: Premark WB Holdings, Inc., Wilmington, DE (US)

( * ) Notice: Subject to any disclaimer, the term of this patent is extended or adjusted under 35 U.S.C. 154(b) by 0 days.

(21) Appl. No.: 09/302,676

(22) Filed: Apr. 30, 1999

(51) Int. Cl.⁷ .................................................. H05K 3/34
(52) U.S. Cl. .................. 29/840; 29/832; 29/843; 174/16.3
(58) Field of Search .............................. 29/840, 843, 830, 29/832; 426/19, 27; 99/335, 348, 327; 165/185, 104.33, 80.2; 174/16.3, 52.4; 361/707, 709, 710, 714, 719

(56) References Cited

U.S. PATENT DOCUMENTS

| | | | |
|---|---|---|---|
| 4,395,133 | 7/1983 | Clevenholm et al. | 366/241 |
| 4,762,057 | 8/1988 | Hirota et al. | 99/348 |
| 4,867,235 * | 9/1989 | Grapes et al. | 165/185 |
| 4,903,587 | 2/1990 | Nagasaka et al. | 99/325 |
| 4,903,588 | 2/1990 | Horiuchi et al. | 99/348 |
| 4,957,040 | 9/1990 | Nakakura et al. | 99/348 |
| 4,982,376 * | 1/1991 | Megens et al. | 361/400 |
| 4,984,512 | 1/1991 | Takahashi et al. | 99/327 |
| 5,054,193 * | 10/1991 | Ohms et al. | 29/840 |
| 5,093,985 * | 3/1992 | Houldsworth et al. | 29/830 |
| 5,182,700 * | 1/1993 | Weimer | 361/400 |
| 5,276,584 * | 1/1994 | Collins et al. | 361/718 |
| 5,351,606 | 10/1994 | Matsuzaki | 99/348 |
| 5,410,949 | 5/1995 | Yung | 99/348 |
| 5,510,127 * | 4/1996 | Wong et al. | 426/19 |
| 5,531,153 | 7/1996 | Maruyama et al. | 99/327 |
| 5,584,233 | 12/1996 | Glucksman et al. | 99/348 |
| 5,590,585 * | 1/1997 | Morishita | 99/327 |
| 5,615,605 | 4/1997 | Kakimoto et al. | 99/348 |
| 5,704,277 | 1/1998 | Yung | 99/327 |
| 5,934,177 * | 8/1999 | Takeda et al. | 99/327 |
| 5,937,740 * | 8/1999 | Kubota et al. | 99/327 |
| 5,947,005 * | 9/1999 | Sit et al. | 99/326 |
| 5,967,020 * | 10/1999 | Soyama et al. | 99/327 |
| 5,973,923 * | 10/1999 | Jitaru | 361/704 |

* cited by examiner

Primary Examiner—Carl J. Arbes
Assistant Examiner—Minh Trinh
(74) Attorney, Agent, or Firm—Michael Best & Friedrich LLP

(57) ABSTRACT

An automatic breadmaker with improved thermal sensing, wiring, and a simplified assembly procedure. The breadmaker preferably includes a high voltage circuit board coupled to an interior wall of the breadmaker, the interior wall separating the baking chamber of the breadmaker from a component compartment. One or more thermal control devices electrically connected to the high voltage circuit board are disposed in a heat transfer relationship with the interior wall, thereby improving device accuracy and avoiding the need for leads to the thermal control devices. In the most preferred embodiment of the present invention, the high voltage circuit board is coupled to the interior wall via a component mounting bracket which also holds the thermal control devices against the interior wall. Preferably, the breadmaker also has a low voltage circuit board connected to the high voltage circuit board via low voltage leads, thereby providing additional safety for users operating a control panel near the low voltage circuit board. In this case, the high voltage circuit board is a power board supplying power to the various breadmaker components, such as the motor, heater, and fan, and the low voltage circuit board is a logic circuit controlling breadmaker operations and being receptive to commands received from a user via the control panel. The high voltage circuit board and the thermal control devices can be pre-assembled in a single assembly for insertion into the breadmaker, thereby decreasing assembly time and cost.

25 Claims, 5 Drawing Sheets

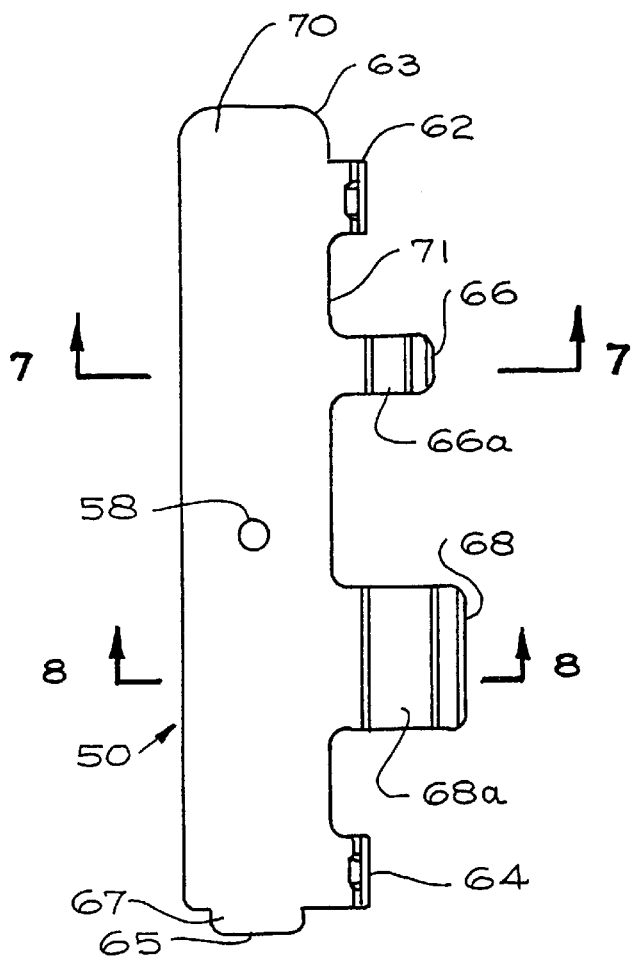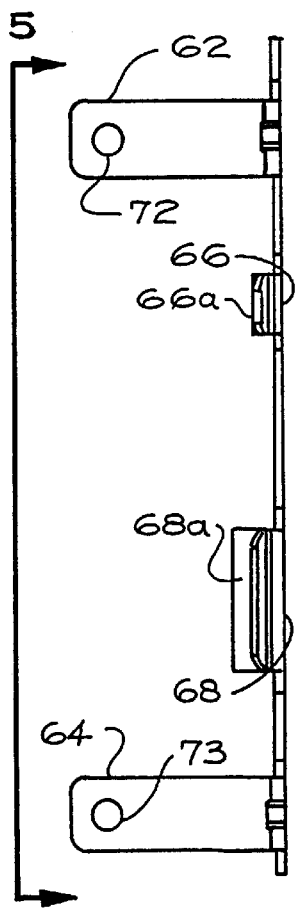
Fig. 5   Fig. 6
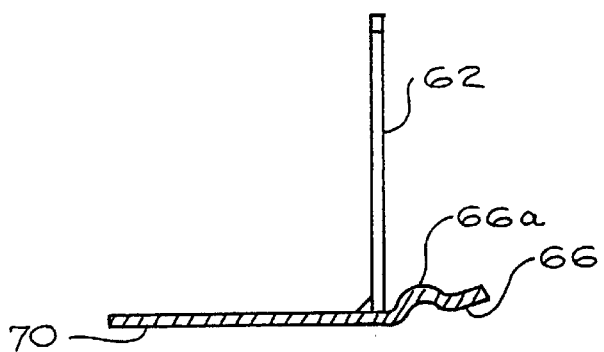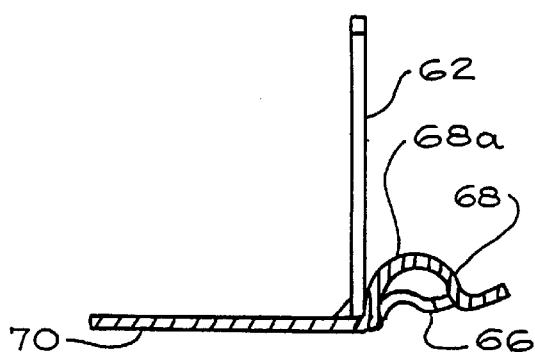
Fig. 7   Fig. 8

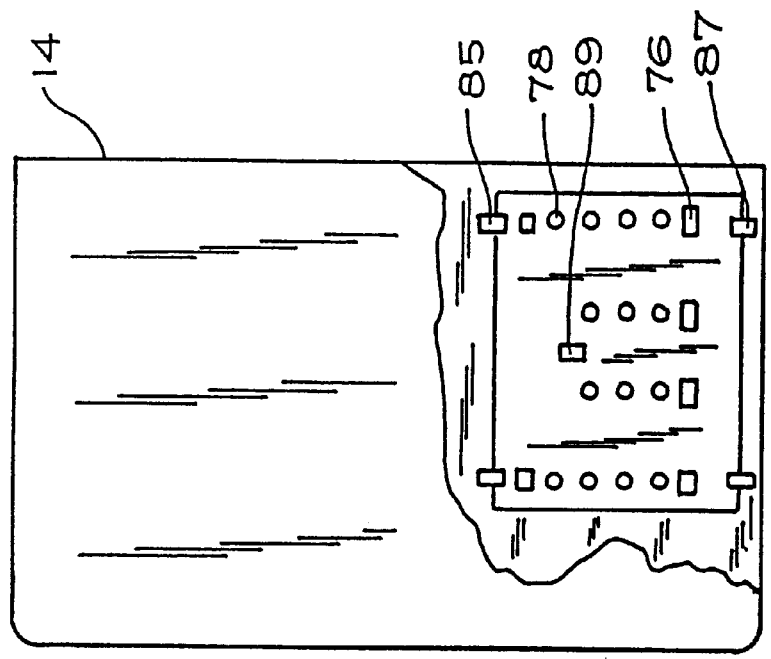
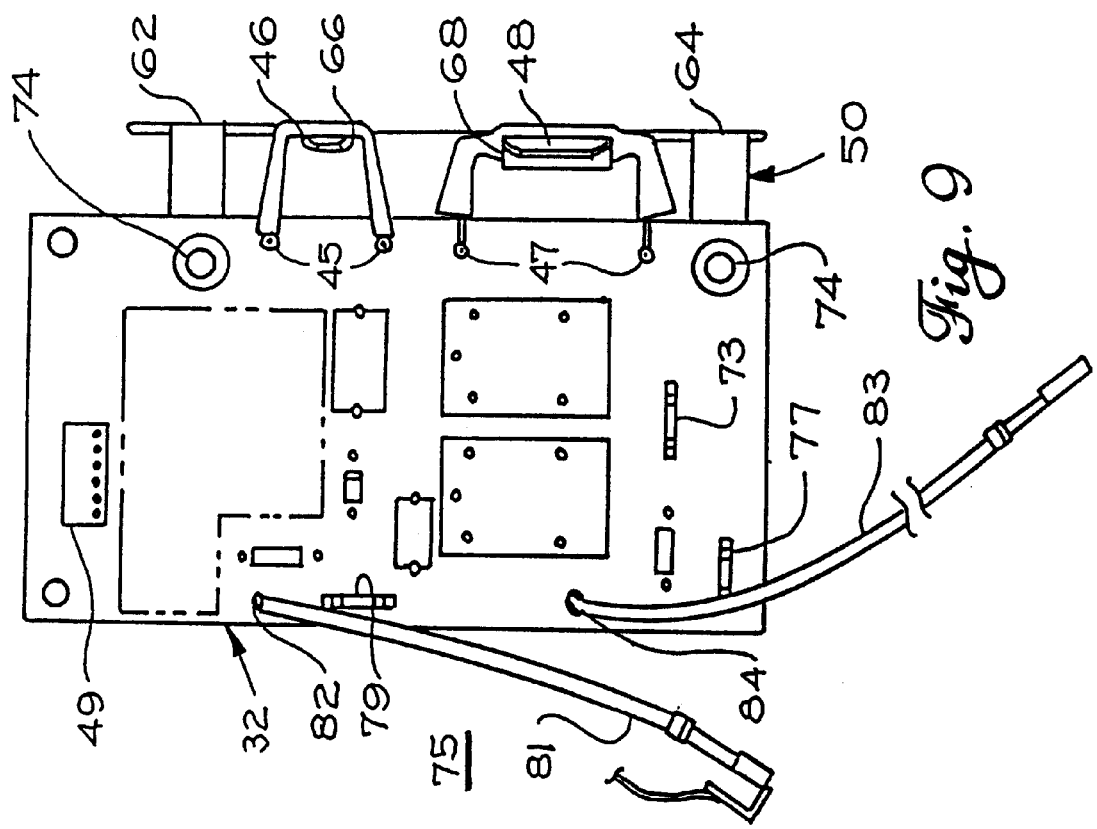

BREADMAKER CIRCUIT BOARD MOUNTING METHOD

FIELD OF THE INVENTION

The present invention relates to automatic breadmakers, and more particularly to devices, assemblies, and methods for mounting electronics within automatic breadmakers.

BACKGROUND OF THE INVENTION

As a result of the continuing commercial demand for automatic breadmakers and the resulting market competitiveness between breadmaker manufacturers, increasing emphasis has been placed upon improvements in virtually every aspect of breadmaker design, assembly, and operation. This is particularly evident with respect to breadmaker controls and circuitry. A controls or circuitry improvement which saves seconds in breadmaker assembly or which provides a more reliable or safer breadmaker design can significantly affect a breadmaker's success in the marketplace.

Conventional control and power circuit assembly represents a large percentage of time required to produce a breadmaker. Typically, such circuitry comprises a circuit board which controls high-voltage power supply and distribution (e.g., to such elements as a heater, fan, or kneading member motor) as well as the lower-voltage elements and electronics commonly used in various breadmaking processes (e.g., a microprocessor, control panel, or temperature sensor). The process of installing conventional circuit boards and related circuitry is usually fairly time consuming, and requires the assembler to secure the board within the breadmaker, run leads to and from the elements in the breadmaker, and connect the leads to their respective locations on the board. Because these labor intensive and time consuming tasks are commonly performed by hand, they add substantial cost to the breadmaker.

Conventional breadmakers typically do not optimally locate electronic components, thereby also significantly increasing the cost and decreasing the reliability of the breadmaker. Often, the location of the breadmaker circuit board is distant from the electrical components to which it is connected. For example, where the circuit board is located proximate to a control panel or other user interface, leads must be run from the control panel to connect to breadmaker parts such as the heater, fan, motor, and temperature sensor. Where multiple circuit boards are used, such as in breadmakers having a power supply board and an electronic controls circuit board, even more leads must be run. The parts and material costs resulting from these connections have a significant impact upon the breadmaker cost.

Apart from the cost of wiring circuit boards which are distant from their connected elements, other problems can arise as a result of such designs. Specifically, voltage drops between the circuit boards and their connected electronic elements are possible. Also, longer leads are more susceptible to electronic noise from the breadmaker motor or from a source external to the breadmaker. Especially in the case of temperature control devices, voltage drops and electronic noise can compromise breadmaking operations and result in poor breadmaker performance.

Yet another problem with conventional breadmakers arises where the same circuit board is used both for high-voltage power supply and distribution and for lower-voltage elements and electronics (see above). Lower-voltage elements and electronics in breadmakers are usually located near or are connected to a user interface such as a control panel. Most conventional breadmakers also mount high voltage circuitry near the user interface, typically mounting all major electronic components on the same board. Short circuits or other electrical malfunctions can endanger the users of a breadmaker employing such a design.

In light of the shortcomings of the prior art and in light of the design requirements and limitations described above, a need exists for a breadmaker apparatus and method which minimizes the time necessary to assemble the electronics in breadmakers, lowers the parts and labor costs associated with breadmaker electronics and installation, lessens system susceptibility to voltage drops and electronic noise, and which provides a safer breadmaker design. Each preferred embodiment of the present invention achieves one or more of these results.

SUMMARY OF THE INVENTION

The breadmaker of the present invention has a baking oven casing at least partly defining a baking chamber within which bread is baked, an interior wall separating the baking chamber from a component compartment and a circuit board located within the component compartment and coupled to the interior wall. At least one thermal control device, such as a temperature sensor, a thermistor, a thermal fuse, or the like, is connected to the circuit board and is preferably held upon the surface of the interior wall. In a preferred embodiment of the present invention, the circuit board is coupled to the interior wall by a component mounting bracket which maintains the thermal control device in heat transfer relationship with the interior wall. Also in a preferred embodiment, the circuit board is a high voltage power board, and is electrically coupled to a lower voltage power board. The high voltage power board preferably supplies power to various breadmaker components such as the motor, heating element and fan. The low voltage power board preferably controls the operations of the breadmaker and includes a timer, microprocessor and related circuitry. The low voltage power board is preferably electrically coupled to a control panel accessible by a user to operate the breadmaker. Low power electrical signals are generated and conducted between the low voltage power board and the high voltage power board, thereby increasing device safety.

The present invention further provides a method for mounting a circuit board assembly in a breadmaker having an oven casing and an interior wall as described above. At least one thermal control device is preferably mounted upon a circuit board. The circuit board is coupled to an interior surface of the breadmaker to mount the thermal control device in heat transfer relationship with the interior surface. Preferably, the circuit board is coupled to the interior wall via a component mounting bracket. More preferably, the thermal control device is a thermostat, thermistor or a thermal fuse held against the interior wall by the component mounting bracket. The circuit board is preferably a high voltage circuit board and a preferred method of the present invention includes the step of connecting the high voltage circuit board to a low voltage circuit board which controls breadmaker operations.

The present invention simplifies assembly of the breadmaker electronics by reducing the number of connections which must be made by the assembler when installing the circuit boards. For example, because the thermal control devices are preferably held by the component mounting bracket against the interior wall of the breadmaker, wires need not be run from the circuit board to the necessary locations in the breadmaker. Indeed, the circuit board of the present invention can be manufactured with the thermal control devices already connected to the circuit board. This facilitates easy installation and hookup of the circuit board within the breadmaker, and saves a significant amount of parts and labor cost. Because less wiring is used, the system is less susceptible to poor performance due to electronic noise and/or voltage drops, particularly with thermal control devices directly connected to the circuit board rather than connected thereto via conventional leads. Where two circuit boards (i.e., a high voltage circuit board connected via low voltage lines to a low voltage circuit board) are used in the most preferred embodiment of the present invention, safer operation of the breadmaker is provided by keeping high voltage elements away from the user interface.

More information and a better understanding of the present invention can be achieved by reference to the following drawings and detailed description.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

FIG. 5 is a front elevational view of a component mounting bracket of the breadmaker shown in FIGS. 1–4.

FIG. 6 is a side elevational view of the component mounting bracket shown in FIG. 5.

FIG. 7 is a section view taken along line 7—7 in FIG. 5.

FIG. 8 is a section view taken along line 8—8 in FIG. 5.

FIG. 9 is a front elevational view of a circuit board assembly of the breadmaker shown in FIGS. 1–4, showing a high voltage power board, the mounting bracket, a temperature sensor, a thermal fuse, and associated wiring conductors.

FIG. 10 is a bottom plan view of the component cover of the breadmaker shown in FIGS. 1–4, shown partially cut away to illustrate the mounting location for the low voltage circuit board.

DETAILED DESCRIPTION OF THE PREFERRED EMBODIMENTS

Figure 1:
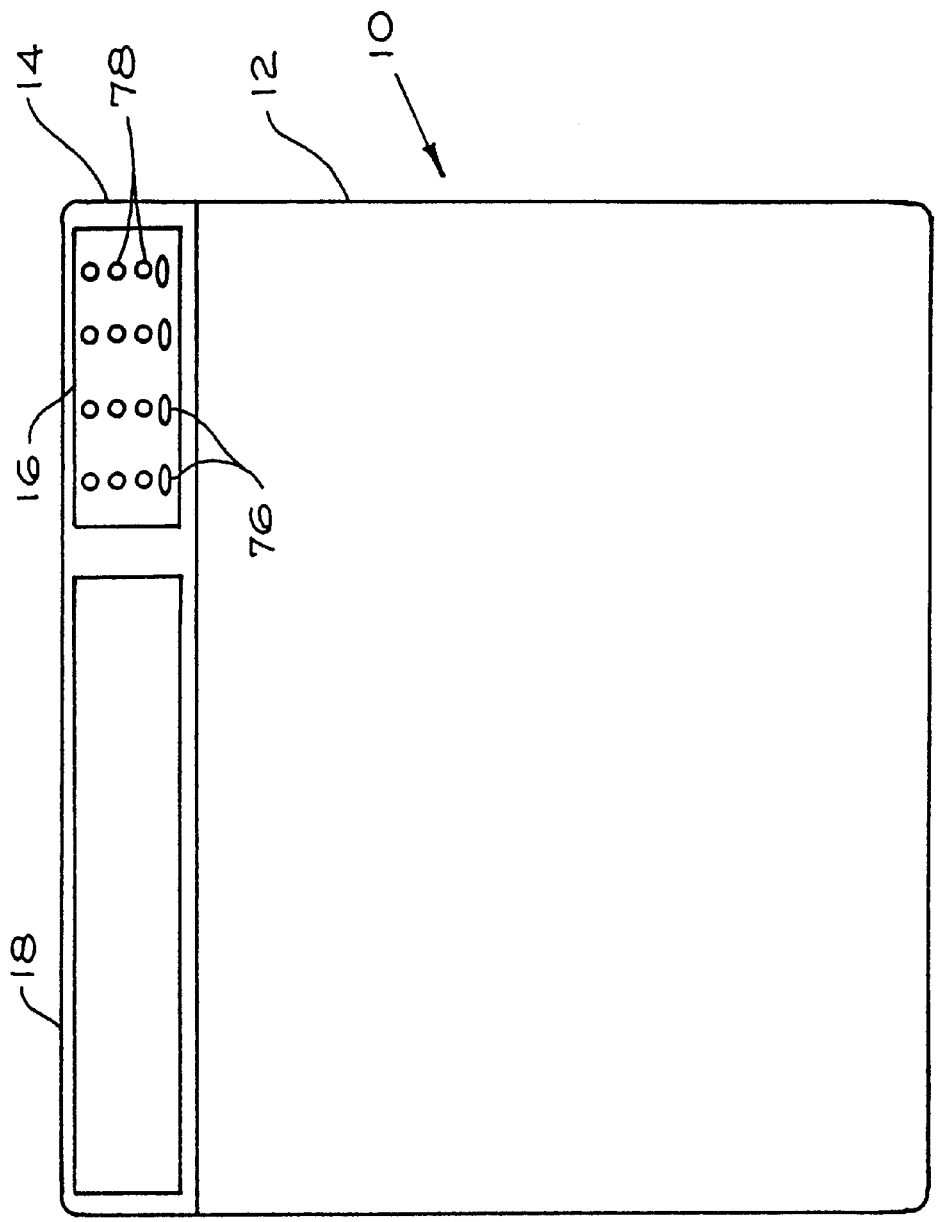
FIG. 1 is a front elevational view of the breadmaker according to a preferred embodiment of the present invention.
Figure 2:
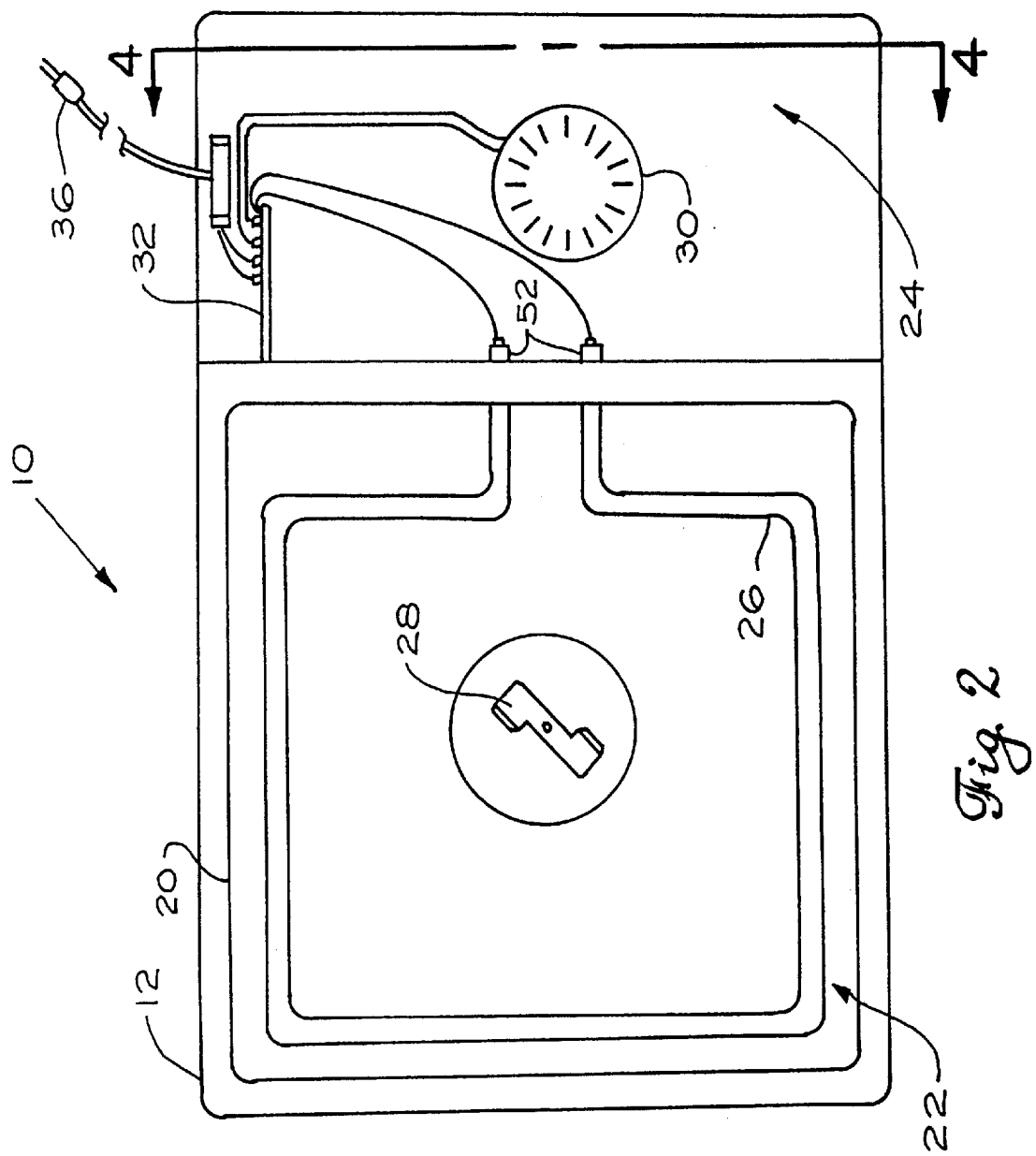
FIG. 2 is a top plan view of the breadmaker shown in FIG. 1, with the cover removed to show the baking compartment and component compartment of the breadmaker.

Referring now to the drawings and, more particularly, to FIGS. 1 and 2, an automatic breadmaker constructed in accordance with a preferred embodiment of the present invention is shown at 10. The breadmaker generally comprises the following parts: a breadmaker casing 12, a component compartment cover 14, a baking compartment cover 18, an oven liner 20 and a user interface 16. As shown in FIG. 2, the oven liner 20 is positioned within the breadmaker casing 12.

Figure 3:
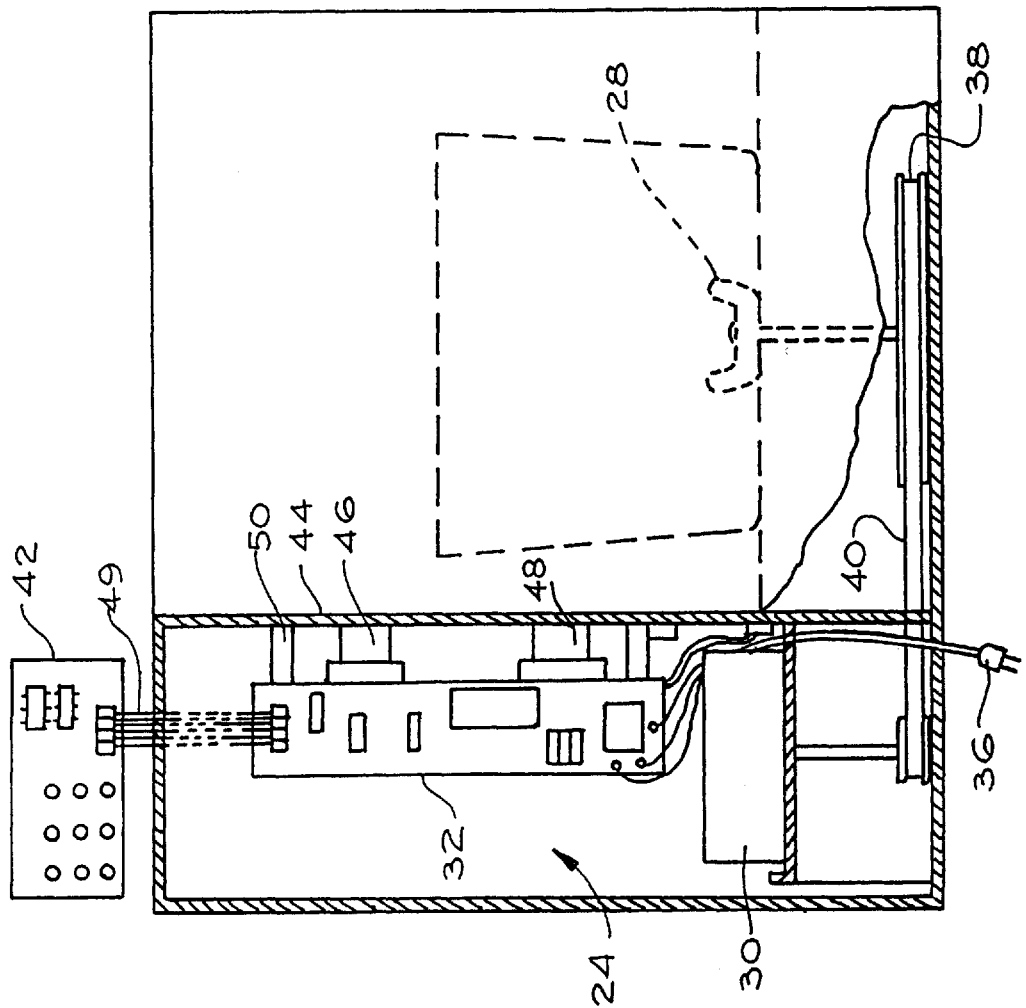
FIG. 3 is a rear elevational view of the breadmaker shown in FIG. 2, partially cut away to show the baking compartment and component compartment.

In order to protect the electronic circuitry and electrical elements of the breadmaker from the high heat and humidity generated during breadmaking operations, the breadmaker 10 preferably has a baking compartment 22 in which bread is produced and a component compartment 24 which houses the electronic circuitry and electrical elements. The baking compartment 22 and the component compartment 24 are separated from one another by a wall 44. In the preferred embodiment of the present invention shown in the figures, the wall 44 is a wall of the oven liner 20. However, the wall 44 can instead comprise one or more elements (either part of the oven liner 20 or separate therefrom). The baking compartment 22 includes a kneading member 28 for kneading the dough and a heating element 26 for baking the dough. Preferably, the component compartment 24 houses a motor 30 and a high voltage power board 32 which is connectable to a source of power through a power cord 36. If desired, the breadmaker 10 can also have a fan (not shown) located within the component compartment 24 and in communication with the baking compartment 22 for circulating air through the baking compartment and/or component compartment in a conventional fashion. Cabling between the high voltage power board 32, the motor 30 and the heating element 26 is preferably contained in the component compartment 24. Referring to FIG. 3, it can be seen that the motor 30 (in the component compartment 24) drives the kneading blade 28 (in the baking compartment 22) through a conventional belt and sprocket assembly 38, 40.

A more detailed view of the electronic circuitry in the preferred embodiment of the present invention is shown in FIG. 3. In general, the high voltage power board 32 is secured to the wall 44 and by virtue of its position with respect to the wall 44, at least one thermal control device 46, 48 secured or electrically connected to the high voltage power board 32 is positioned upon the wall 44. Preferably, a component mounting bracket 50 (described in more detail below) secures the high voltage power board 32 to the wall 44. Other types of mounting elements, such as brackets having different shapes and sizes, one or more clips extending from the wall 44 or high voltage power board 32 to engage the high voltage power board 32 or wall 44, respectively, conventional board fastening elements such as screws, pins, interengaging tabs, etc. can be used to mount the high voltage power board 32 to the wall 44. In all such cases, however, the thermal control device connected to the board is preferably brought into contact with the surface of the wall 44 when the high voltage power board 32 is mounted in place upon the wall 44.

The thermal fuse 46 and the temperature sensor 48 are preferably mounted directly to the high voltage power board 32. In a highly preferred embodiment of the present invention, the thermal fuse 46 and the temperature sensor 48 are mounted via a direct solder connection to respective pairs of plated through-holes 45, 47 (see FIG. 9) on the board. However, other known connection arrangements can be used for electrically and mechanically mounting the thermal control devices on the high voltage power board 32.

In the preferred embodiment of the present invention, the element or elements which mount the high voltage power board 32 to the wall 44 is/are the same element or elements which position the thermal control devices 46, 48 upon the wall 44. In the most preferred embodiment of the present invention, the high voltage power board 32 is mounted upon the wall 44 via the component mounting bracket 50, which itself holds the thermal fuse 46 and a temperature sensor 48 against the wall 44 and in heat transfer relationship with the wall 44 as will be discussed in more detail below.

The high voltage breadmaker components, including the motor 30 and the heating element 26, are connected directly to the high voltage power board 32 in one highly preferred embodiment. The motor 30 and the power cord 36 can be connected to the high voltage power board 32 via spade lugs or other well-known connectors. The heating element 26 preferably has heating element connectors 52 which are connected directly to the high voltage power board 32 through a solder connection, much in the same way that the thermal fuse 46 and the temperature sensor 48 are connected to the power board 32. It will be appreciated by one having ordinary skill in the art that each of the connections to the high voltage power board can take any number of forms, including spade lug connections, pin and socket and other male to female connections, and direct solder connections.

Preferably, all of the high power functions of the breadmaker are confined to the high voltage power board 32. The input voltage, which can be 120 VAC or other voltage as desired, is coupled to the high voltage power board 32 (e.g., via the power cord 36). The high voltage power board 32 preferably includes a rectifier circuit which rectifies the 120 VAC input voltage to a DC value and converts the rectified voltage to one or more low level or logic level DC voltages. This circuitry is well known to those skilled in the art and is not therefore described in greater detail herein. The low level voltage, which can be a 5-volt, 15-volt or other low voltage signal, is transmitted to a low voltage logic board 42 (described in more detail below) through a low voltage cable 49. The low voltage logic board 42 is preferably mounted within the component compartment, and more preferably on the component compartment cover 18, but can instead be located on any user-accessible surface of the breadmaker if desired. The high voltage power board 32 further preferably includes suitable switching devices, such as relays or solid state switches, to activate the motor 30, the heating element 26 and the other high voltage components of the breadmaker 10. This circuitry is also well known to those skilled in the art, and is not therefore described in greater detail herein.

As described above, the preferred embodiment of the present invention employs a component mounting bracket 50 for mounting the high voltage power board 32 to the wall 44 separating the baking compartment 22 from the component compartment. A preferred mounting bracket 50 is illustrated by way of example in FIGS. 5–9. The mounting bracket 50 acts both to provide a standoff for the high voltage power board 32 (keeping the board 32 and its circuitry away from the wall 44 which can become hot during breadmaker operation) and to locate the thermal control devices 46, 48 in heat transfer relationship with the wall 44 to detect temperatures in the breadmaking compartment 22 and to control breadmaker operations based upon such temperatures. The preferred embodiment of the component mounting bracket 50 comprises five parts: a mounting section 70, two bracket standoffs 62 and 64, a thermal fuse coupling clip 66, and a temperature sensor coupling clip 68. The component mounting bracket 50, which in the preferred embodiment of the present invention is generally vertically oriented within the component compartment 24, also can function as a center for loose wiring interconnecting the high voltage components of the breadmaker, such as the motor 30, the heating element 26, and the fan (not shown) to the high voltage power board 32. Preferably, the low voltage cable 49 provides the only electrical connections to the low voltage logic board 42.

The mounting section 70 of the preferred component mounting bracket 50 is generally rectangular with rounded corners, and with tabs 63 and 65 defined at opposite ends of the mounting section 70. For ease of component mounting bracket and high voltage power board installation, the tabs 63 and 65 are preferably dimensioned to be received in mounting slots 54 and 56 in the wall 44, and also have curved corners to aid insertion into the slots 54 and 56.

Figure 4:
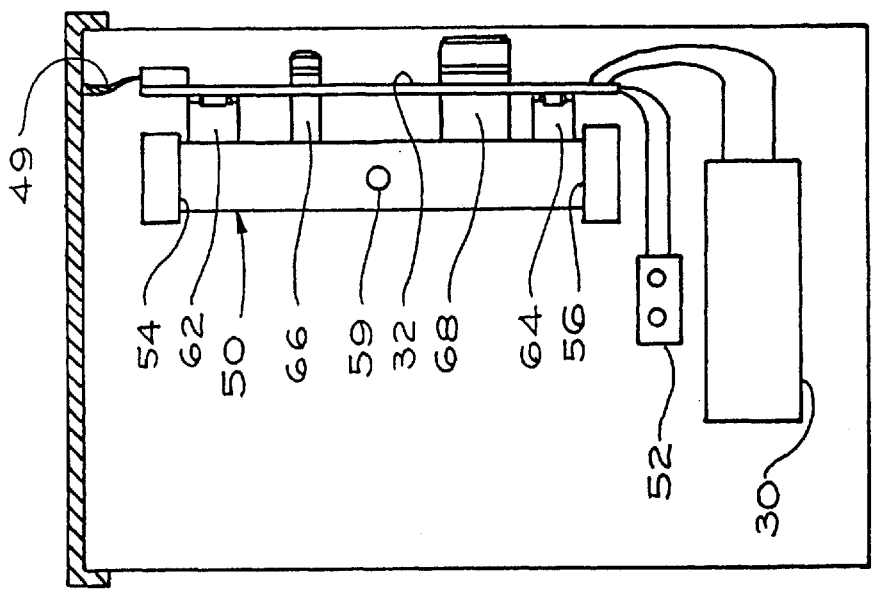
FIG. 4 is a vertical section view taken along line 4—4 in FIG. 2.

The component mounting bracket 50 can be secured to the wall 44 in any number of conventional manners, such as by riveting, gluing, welding, clamping, male and female interengaging members, etc. For example, the preferred embodiment of the component mounting bracket 50 illustrated in the figures has an aperture 58 through the mounting section 70. A rivet 59 (see FIG. 4), bolt, screw, or other conventional fastener can be passed through the aperture 58 and into a corresponding aperture in the wall 44 to secure the component mounting bracket 50 to the wall 44. Although a single mounting hole 58 is shown in the figures, any number of mounting holes and corresponding fasteners can be used.

The length of the generally rectangular mounting section 70 is preferably dimensioned to be substantially the same length as the high voltage power board 32. This dimension allows the standoffs 62 and 64 of the component mounting bracket 50 to be located at opposite ends of the mounting section 70 for supporting the high voltage power board 32 at its opposite ends. Although it is desirable to secure the component mounting bracket 50 to the wall 44 of the breadmaker 10, the component mounting bracket 50 can instead be secured to any interior surface of the breadmaker 10, as long as the orientation and placement of the component mounting bracket 50 locates or holds the thermal control devices 46, 48 in heat transfer relationship with a wall of the oven liner 20 (preferably, the sidewall 44) as will be discussed below.

It will be apparent to one having ordinary skill in the art that the dimensions and shape of the mounting section 70 and indeed, of the entire mounting bracket 50, can be far different than that illustrated in the figures and described herein while still falling within the scope of the present invention. Specifically, at a minimum the mounting section 70 should be sized and shaped to adequately secure the high voltage power board 32 to the component mounting bracket 50. As such, the mounting section 70 can take the form of a narrow elongated clip or clips holding one or more edges of the high voltage power board 32, a frame or similar structure surrounding or beside the high voltage power board 32, or any other form capable of securing the high voltage power board 32 with respect to the component mounting bracket 50.

As with the connections between the wall 44 and the component mounting bracket 50, the component mounting bracket 50 can be secured to the high voltage power board 32 in any number of conventional manners, such as by riveting, gluing, clamping, male and female interengaging members, etc. For example, the preferred embodiment of the component mounting bracket 50 illustrated in the figures employs a pair of standoffs 62, 64 (mentioned above) extending a distance from an edge 71 of the component mounting bracket 50. The standoffs 62, 64 preferably are disposed at an angle with respect to the mounting section 70, and have mounting holes 72 for attachment to the high voltage power board 32. Rivets 74 or other conventional fasteners extend through the mounting holes 72 and into corresponding holes (not shown) in the high voltage power board 32. To maximize control board space, the standoffs 62, 64 are sized to take up a minimum amount of space on the control board while still providing adequate attachment strength for the high voltage power board 32.

One having ordinary skill in the art will appreciate that the bracket standoffs 62, 64 described above and illustrated in the figures can vary significantly in shape, size, number, and orientation. Any type of element which is connectable to the high voltage power board 32 and positions the board a distance away from the wall 44 performs the basic functions necessary for the standoffs of the present invention. Though not preferred, such elements can even be separate and distinct from the component mounting bracket 50 and be attached to the wall 44 of the breadmaker in a conventional manner. In such case, the elements would be located upon the wall 44 near the corresponding elements of the component mounting bracket (e.g., the mounting section 70, tabs 63, 65, and coupling clips 66, 68) which still perform the same functions.

A significant advantage of the present invention results from the direct connection established between certain electrical elements and the high voltage power board. Use of the term "direct" herein does not necessarily imply that the electrical elements do not have leads or wiring connecting the electrical elements to the board, but instead refers to an element-to-board connection not necessarily requiring separate or additional wiring. Such a connection can position the electrical element a distance away from the board (e.g., see elements 46 and 48 in FIG. 9). Where these connections are for thermal control devices of the breadmaker (such as a thermal fuse 46 and a temperature sensor 48), such connections reduce the number of breadmaker parts, reduce the amount of time required for breadmaker assembly, and improve the accuracy of breadmaking operations.

Direct connection can be accomplished in a number of ways according to the present invention, one highly preferred manner being illustrated in the figures, where the exemplary embodiment of the breadmaker 10 has a thermal fuse 46 and a temperature sensor 48 for monitoring and controlling breadmaker operations. The fuse and temperature sensor themselves are conventional in nature, but their arrangement pursuant to the present invention is unique. Specifically, both thermal control elements 46, 48 are directly attached to the high voltage power board 32, saving the time and parts required for running leads between these elements and the high voltage power board 32. To hold the thermal control elements 46, 48 in heat transfer relationship on the wall 44 of the breadmaker 10, the component mounting bracket 50 to which the high voltage power board 32 is attached preferably has two coupling clips 66, 68 extending therefrom. One coupling clip 66 holds the thermal fuse 46 against the wall 44 and one coupling clip 68 holds the temperature sensor 48 against the wall 44. The coupling clips 66, 68 preferably extend from the edge 71 of the component mounting bracket 50, and more preferably are disposed at an angle to the bracket standoffs 62, 64 so that the high voltage power board 32 is at an angle (most preferably, at a right angle) with respect to the wall 44.

Coupling clip 66 preferably includes a rounded bend 66*a* dimensioned to secure and partially hold the thermal fuse 46 which is directly connected to the high voltage power board 32 in a conventional manner at contact points 45. Similarly, the coupling clip 68 preferably includes a rounded bend 68*a* dimensioned to receive and partially hold the temperature sensor 48 which is directly connected to the high voltage power board 32 in a conventional manner at contact points 47. More preferably (though not absolutely necessary), both clips 66, 68 are of sufficient length, thickness, and resiliency to exert a bias force upon their respective thermal control elements 46, 48 to thereby ensure better contact of the thermal control elements 46, 48 with the wall 44. Good contact with the wall 44 is important for the thermal control elements 46, 48 to obtain accurate thermal readings.

Because the thermal control elements 46, 48 are directly connected to the high voltage power board 32 and are positioned upon the wall 44 in this manner, fast assembly with fewer parts and a more accurate temperature monitoring design is achieved. Of course, the particular shape and size of the coupling clips 66, 68 can significantly vary from the exemplary embodiment illustrated in the figures while still performing the function of positioning and/or holding the thermal control elements 46, 48 in thermal transfer relationship with the wall 44. The shape and size of each coupling clip 66, 68 will depend largely upon the shape and size of the thermal control element it holds or engages. Also, more or fewer coupling clips can be used depending upon the number of thermal control elements used in the breadmaker 10. It should be noted that although the thermal control elements herein are described as being a thermal fuse and a temperature sensor, any other type of thermal element can be secured, held, or positioned upon a surface of the oven liner 20 as desired in much the same way as described above.

While one highly preferred embodiment for the coupling clips is described in detail herein and shown in the figures, it is apparent that other support and bias elements and mechanisms can instead be used. For example, the component mounting bracket 50 can have springs attached thereto to which the thermal control devices are attached and biased into contact with the wall 44 of the breadmaker 10. The springs can be conductive (in which case they may be used as the electrical contacts of the thermal control devices to the high voltage power board) or nonconductive, and can be in the form of coil, leaf, torsion, other conventional spring types. The component mounting bracket can instead be resilient levers, bars, rods, pins, compressible (e.g., elastomeric) pads, or other elements capable of holding or pressing the thermal control devices against the wall 44. Though not preferred, it is also possible to position the thermal control devices upon the high voltage power board 32 such that when the component mounting bracket 50 and attached high voltage power board 32 are installed upon the wall, a surface or surfaces of the component mounting bracket 50 press the thermal control devices against the wall 44 without the need for dedicated coupling clips or other support and bias elements or mechanisms.

It should be noted that although the preferred embodiment of the present invention employs a component mounting bracket 50, this is not absolutely necessary to practice the invention. Use of a component mounting bracket 50 is preferred for a number of reasons, including protection of the high voltage power board 32 against heat transfer from the wall 44 (or other portion of the oven liner 20 to which the high voltage power board 32 is attached), ease of attachment for conventional power boards, etc. However, a high voltage power board can be adapted to be secured within the component compartment 24 pursuant to the present invention in other ways. For example, the high voltage power board 32 can be provided with fasteners, tabs, pins, or other conventional elements which mate, engage, or fasten to the wall 44 or other portion of the oven liner 20. The high voltage power board 32 can even be provided with integral standoffs functioning in the same manner as the standoffs 62, 64 in the preferred embodiment. Because the high voltage power board 32 is therefore secured directly to a surface which can generate significant heat capable of damage to the board and electronic components thereon, it is highly preferred that one or more insulation elements shield the board from the heat. The board can be fastened to the insulation elements which are themselves attached to the wall 44, or the board can be lined with insulative material (such as, for example, a sheet of insulation between the board and the wall). As another example, the high voltage power board can be secured directly to a wall of the breadmaker casing 12 within the component compartment and in sufficient proximity to the wall 44 to be sensed for locating the thermal control devices thereon in a manner as described above. Several other board mounting arrangements serve the same purpose of locating or holding the thermal control devices upon the wall 44 while securing the high voltage power board 32 within the component compartment 24 proximate the wall 44. Such arrangements fall within the scope of the present invention.

With reference to FIG. 9, the high voltage power board assembly 75 includes the high voltage power board 32, the component mounting bracket 50, the thermal fuse 46 and the temperature sensor 48. In one preferred embodiment of the present invention, the high voltage power board 32 includes three spade lugs 73, 77, and 79 for making high power connections to the power board 32. Power is supplied to the high voltage power board 32 via the power cord 36 preferably connected to lugs 73 and 77. Power is distributed throughout the breadmaker in one preferred (though strictly exemplary) manner as follows: one terminal of the motor 30 is preferably connected to lug 79 and two high power conductors 81 and 83 are preferably soldered directly to the power board 32 through solder through-holes 82 and 84, and terminate in spade lug connections which are coupled to the connectors 52 of the heating element 26. One terminal of the motor 30 is preferably connected to the power board 32 at lug 79, and a second terminal of the motor 32 preferably connects to the power board 32 and to circuit neutral via the conductor 81. Of course, different connections to the high voltage power board 32 are possible, and can be made in a number of different manner as described above.

Referring now to FIG. 10, which is a bottom view of the cover 14 of the breadmaker 10, the cover 14 is partially broken away to show the preferred mounting location for the low voltage logic board 42 within the component compartment cover 14. The low voltage logic board 42 includes logic circuitry and components (e.g., microprocessor, timer, etc.) for operating the breadmaker 10, and is preferably mounted to the cover 14 by standoffs 85, 87 and 89 located on the inner surface of the component cover 14. Other conventional board connection arrangements well known to those skilled in the art are also possible. Referring also to FIG. 1, a series of soft-touch push buttons 76 forming at least part of the user interface 16 preferably control corresponding buttons on the low voltage logic board 42 for selecting various types of bread, bread making conditions, baking times, and other breadmaker operations. Also preferably, a series of clear display sections on the user interface allows the user to view through the user interface indicator light emitting diodes (LEDs) 78 on the low voltage logic board 42.

As discussed above, it is desirable that the functions on the low voltage logic board 42 be controlled with low voltage or logic level signals, thereby eliminating the requirement for high voltage signals to be supplied to the low voltage logic board 42 and increasing the safety for users interfacing with a control panel near or atop the low level logic board. A further advantage of locating only low power logic functions and associated indicators, timing and push-buttons on a board separate from the high power components is that such an arrangement permit replacement of the low voltage components independent of the high power components (and vice versa).

Assembly of the automatic breadmaker 10 is greatly simplified through the high voltage board arrangement described above, and more particularly through use of the component mounting bracket 50. Many of the major components, including the temperature sensor 48 and the thermal fuse 46, can be initially formed as part of a subassembly with the high voltage power board 32. Moreover, spade lugs or other known connecting devices on the high voltage power board 32 facilitate input power connection and connection of the motor 30 to the high voltage power board 32. The heating element 26 can be connected to the high voltage power board 32 by wires which are soldered directly to the high voltage power board 32. The low voltage cable 49, extending between the high voltage power board 32 and the low voltage logic board 42 can also be soldered directly to the high voltage power board 32, thereby eliminating the need for an additional connector. The high voltage power board 32 can also be preassembled upon the component mounting bracket 50, if desired (e.g., via rivets through the mounting bracket standoffs 62, 64). As such, a significant amount of assembly time can be saved by creating a subassembly (e.g., assembly 75), where a number of connections are made prior to insertion of the boards into the breadmaker 10.

To install the high voltage power board in the breadmaker 10, the tabs 63 and 65 of the mounting section 70 on the component bracket 50 are preferably inserted into bracket mounting slots 54 and 56 in the wall 44. The component mounting bracket 50 is then preferably riveted to the wall 44 (e.g., via a rivet 59 through aperture 58 and into the wall 44). Although riveting is shown both to connect the high voltage power board 32 to the component mounting bracket 50 and to connect the mounting bracket 50 to the baking case 20, it is understood that screws, bolts or other conventional fastening devices or methods can instead or also be used. Once the component mounting bracket 50 and high voltage power board 32 are installed upon the wall 44 of the oven liner 20, connections can easily be made between the high voltage power board 32 and the motor fan 30, the heating element 26 and the input power cord 36.

The automatic breadmaker 10 therefore has a simpler design and is less expensive to assemble. Furthermore, the configuration of the breadmaker 10 provides several advantages. For example, because the temperature components such as the thermal fuse and the temperature sensor are mounted directly to the high voltage power board 32 using only the very short leads of the components, the breadmaker circuitry is less susceptible to electronic noise and voltage drops, and improved temperature monitoring is achieved. Also, because high voltage circuitry is separated from low voltage circuitry, there is less noise on the logic board due to electromagnetic interference from the motor and other high voltage components within the breadmaker 10. As noted above, because many of the components are soldered directly to the high voltage power board 32 rather than being connected to the power board 32 through conventional connectors, the number of parts needed to assemble the breadmaker is minimized. Furthermore, the positioning of the components in the breadmaker 10 decreases the amount of wiring required, thereby also reducing the expense of the breadmaker. In addition, the breadmaker 10 is made safer by locating the user interface a distance away from the high voltage components.

The embodiments described above and illustrated in the drawings are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, the breadmaker 10 disclosed herein is described and illustrated as having a baking compartment 22 located in side-by-side relationship with a component compartment 24 and separated therefrom by a wall 44 preferably making up part of the oven liner 20. The preferred mounting arrangement for the high voltage power board 32 and the low voltage logic board 42 disclosed herein is largely a function of this compartment relationship. However, it will be appreciated by one having ordinary skill in the art that the present invention can be practiced even though the compartments 22, 24 are oriented in different relationships with respect to one another. In such other arrangements, the low voltage power board 42 can still be mounted to any wall or surface of the oven liner 20 while still being in an area of the breadmaker shielded from the heat and humidity generated in the baking compartment 22.

Also, the use of separate electronic circuit boards offers significant design and assembly advantages described above. However, many advantages of the present invention are still achieved with only one circuit board (rather than a high voltage power board and a low voltage logic board). Although not preferred, one electronic circuit board can be used in the present invention, with both high and low voltage circuitry and components thereon. In such case, the description above regarding "high" and "low" voltage electronic circuit boards applies with equal force to a single electronic circuit board. Certain advantages still remain in a one circuit board design, such as those resulting from positioning thermal control devices upon the oven liner wall 44 without additional leads or wiring, preassembly of the electronic circuit board to reduce parts and labor required in assembly of the breadmaker, etc. Conversely, it should be noted that the present invention can be practiced with multiple electronic circuit boards used in a breadmaker, if desired.

We claim:

1. A method for mounting a circuit board assembly in a bread maker, the bread maker including an oven liner having a sidewall, the method comprising the steps of:

mounting at least one thermal component on a circuit board to form the circuit board assembly;

coupling a component mounting bracket to the circuit board assembly; and securing the component mounting bracket to the sidewall, wherein the at least one thermal component is disposed in thermal transfer relation with the sidewall via the component mounting bracket.

2. The method as claimed in claim 1, wherein coupling the component mounting bracket to the circuit board assembly includes the step of positioning the thermal component within a coupling clip of the component mounting bracket.

3. The method as claimed in claim 2, wherein securing the component mounting bracket to the sidewall includes the steps of providing at least one mounting slot in the sidewall of the oven liner, and sliding a mounting section of the component mounting bracket into the mounting slot for mounting the circuit board assembly on the sidewall with the coupling clip urging the thermal component into engagement with the sidewall in thermal transfer relation therewith.

4. The method as claimed in claim 1, wherein mounting the at least one thermal component on a circuit board includes the step of electrically soldering terminals of the at least one thermal component to the circuit board whereby the at least one thermal component is electrically and mechanically connected to the circuit board.

5. The method as claimed in claim 3, wherein coupling the component mounting bracket to the circuit board assembly includes the step of riveting the circuit board to at least one standoff of the component mounting bracket, and wherein securing the component mounting bracket to the sidewall includes the step of riveting the mounting section of the component mounting bracket to the sidewall.

6. The method as claimed in claim 1, wherein the at least one thermal component is a thermal fuse.

7. The method as claimed in claim 1, wherein the at least one thermal component is a temperature sensor.

8. The method as claimed in claim 1, further comprising the step of holding the at least one thermal component between the sidewall and the component mounting bracket.

9. The method as claimed in claim 8, wherein the at least one thermal component is held between the sidewall and a coupling clip of the component mounting bracket.

10. The method as claimed in claim 1, wherein the circuit board is a high voltage power board, the method further comprising the step of coupling the circuit board to a source of electrical power.

11. The method as claimed in claim 1, wherein the circuit board is a high voltage power board, the method further comprising the step of coupling a low voltage logic board to the high voltage power board.

12. The method as claimed in claim 11, wherein the high voltage power board and the low voltage logic board are separated a distance from one another.

13. The method as claimed in claim 11, wherein the at least one thermal component is resiliently held against the sidewall.

14. The method as claimed in claim 13, wherein the at least one thermal component is resiliently held against the sidewall by the component mounting bracket.

15. A method for mounting a circuit board assembly within a breadmaker having at least one internal wall, comprising the steps of:

providing a circuit board having a thermal component mounted thereon;

coupling the circuit board to the wall within the breadmaker; and retaining the thermal component against and in heat transfer relationship with the wall during the coupling step.

16. The method as claimed in claim 15, wherein the coupling step includes coupling the circuit board to a mounting bracket and coupling the mounting bracket to the wall.

17. The method as claimed in claim 15, wherein the thermal component is coupled directly to the circuit board.

18. The method as claimed in claim 15, wherein the circuit board is free from contact with the wall.

19. The method as claimed in claim 15, wherein the thermal component is a thermal fuse.

20. The method as claimed in claim 15, wherein the thermal component is a temperature sensor.

21. The method as claimed in claim 16, further comprising the step of retaining the thermal component between the mounting bracket and the wall.

22. The method as claimed in claim 21, wherein the mounting bracket has a coupling clip, the retaining step including retaining the temperature component between the coupling clip and the wall.

23. The method as claimed in claim 21, wherein the thermal component is resiliently retained between the thermal component and the wall.

24. The method as claimed in claim 16, further comprising the step of coupling the circuit board to a source of electrical power.

25. The method as claimed in claim 24, further comprising the step of coupling a low voltage logic board to the circuit board, the low voltage logic board located a distance from the circuit board.

* * * * *